United States Patent
Yamaguchi et al.

(10) Patent No.: US 8,859,444 B2
(45) Date of Patent: Oct. 14, 2014

(54) OPTICAL GLASS, PRESS-MOLDING GLASS MATERIAL, OPTICAL ELEMENT AND PROCESS FOR PRODUCING THE SAME

(75) Inventors: Kosuke Yamaguchi, Tokyo (JP); Yoichi Hachitani, Tokyo (JP)

(73) Assignee: Hoya Corporation, Tokyo (JP)

( * ) Notice: Subject to any disclaimer, the term of this patent is extended or adjusted under 35 U.S.C. 154(b) by 389 days.

(21) Appl. No.: 12/893,188

(22) Filed: Sep. 29, 2010

(65) Prior Publication Data

US 2011/0077142 A1 Mar. 31, 2011

(30) Foreign Application Priority Data

Sep. 30, 2009 (JP) ................. 2009-228244
Aug. 26, 2010 (JP) ................. 2010-189142

(51) Int. Cl.
*C03C 3/068* (2006.01)
*C03C 3/066* (2006.01)

(52) U.S. Cl.
CPC ............... *C03C 3/068* (2013.01); *C03C 3/066* (2013.01)
USPC ............. 501/78; 501/79; 501/50; 501/51

(58) Field of Classification Search
CPC .......... C03C 3/066; C03C 3/068; C03C 3/15; C03C 3/155
USPC .................... 501/78, 79, 50, 51
See application file for complete search history.

(56) References Cited

U.S. PATENT DOCUMENTS

| | | | | |
|---|---|---|---|---|
| 4,120,732 A * | 10/1978 | Komorita et al. | ............... | 501/42 |
| 6,645,894 B2 * | 11/2003 | Endo | ............... | 501/51 |
| 7,138,349 B2 * | 11/2006 | Uehara et al. | ............... | 501/78 |
| 7,598,193 B2 * | 10/2009 | Endo | ............... | 501/78 |
| 8,263,510 B2 * | 9/2012 | Kobayashi et al. | ............... | 501/51 |
| 2003/0032542 A1 | 2/2003 | Endo | | |
| 2003/0211929 A1 * | 11/2003 | Hayashi et al. | ............... | 501/78 |
| 2008/0119348 A1 | 5/2008 | Hayashi | | |
| 2008/0287280 A1 * | 11/2008 | Onoda et al. | ............... | 501/78 |
| 2009/0082190 A1 | 3/2009 | Ogino | | |
| 2009/0088310 A1 | 4/2009 | Suzuki et al. | | |
| 2009/0163345 A1 * | 6/2009 | Onoda et al. | ............... | 501/78 |
| 2009/0176641 A1 | 7/2009 | Kobayashi et al. | | |
| 2010/0113248 A1 * | 5/2010 | Onoda | ............... | 501/78 |
| 2011/0028300 A1 | 2/2011 | Zou et al. | | |

FOREIGN PATENT DOCUMENTS

| | | |
|---|---|---|
| CN | 1445188 A | 10/2003 |
| CN | 1237018 C | 1/2006 |
| CN | 1729147 A | 2/2006 |
| CN | 1 754 849 A | 4/2006 |
| CN | 101397189 A | 4/2009 |
| CN | 101506115 A | 8/2009 |
| DE | 27 56 161 A1 | 6/1979 |
| EP | 1 245 544 A2 | 10/2002 |
| EP | 2 039 662 A1 | 3/2009 |
| JP | 52 014607 A | 2/1977 |
| JP | 56 160340 A | 12/1981 |
| JP | 2002 128539 A | 5/2002 |
| JP | 2007 269584 | 10/2007 |
| JP | 2008-001551 | 10/2008 |
| JP | 2009-167079 | 7/2009 |
| WO | WO 2007148816 A1 * | 12/2007 |
| WO | WO 2009/096439 A1 | 8/2009 |

OTHER PUBLICATIONS

EP Search Report in EP 10 00 9955 dated Feb. 3, 2011.
Official Action issued in Japanese Patent Application No. 2010-189142 (with English language excerpt) dated Jul. 16, 2013.
Official Action and English language translation in CN 201010503570.4 dated Aug. 5, 2013.
Official Action in EP 10 009 955.5 dated Oct. 15, 2013.
Office Action and English language translation in JP 2010-189142 dated Dec. 10, 2013.
CN Second Office Action with English translation in CN201010503570.4 dated May 20, 2014.

* cited by examiner

*Primary Examiner* — Anthony J Green
*Assistant Examiner* — Elizabeth A Bolden
(74) *Attorney, Agent, or Firm* — Nixon & Vanderhye P.C.

(57) ABSTRACT

A high-refractivity low-dispersion optical glass of which the $Ta_2O_5$ content is suppressed is provided, the optical glass comprising, by mass %, 1 to 30% of $B_2O_3$,
0.1 to 20% of $SiO_2$,
55 to 75% of a total of $La_2O_3$, $Gd_2O_3$, $Y_2O_3$ and $Yb_2O_3$,
the content of $La_2O_3$ being 15 to 55%, the mass ratio of the content of $Gd_2O_3$ to the total content of $La_2O_3$, $Gd_2O_3$, $Y_2O_3$ and $Yb_2O_3$, $Gd_2O_3/La_2O_3+Gd_2O_3+Y_2O_3+Yb_2O_3$), being 0.17 to 0.65,
0 to 13% of $Ta_2O_5$ (exclusive of 13%), and
0 to 25% of a total of $Nb_2O_5$, $TiO_2$, $WO_3$ and $ZrO_2$, the content of $Nb_2O_5$ being less than 10%, and
having a refractive index nd of 1.83 to 1.92 and an Abbe's number vd of 36 to 45.

8 Claims, No Drawings

US 8,859,444 B2

OPTICAL GLASS, PRESS-MOLDING GLASS MATERIAL, OPTICAL ELEMENT AND PROCESS FOR PRODUCING THE SAME

FIELD OF THE INVENTION

This invention relates to an optical glass, press-molding glass material, an optical element and a process for producing the optical element.

BACKGROUND ART

A high-refractivity low-dispersion glass is an optical glass having high utility as an optical element material for lenses and prisms. As such an optical glass, there are known optical glasses disclosed in Patent Documents 1 and 2.

PRIOR ART DOCUMENT

Patent Document

[Patent Document 1] JP 2001-348244A
[Patent Document 2] JP 2008-1551A

SUMMARY OF THE INVENTION

Problems to be Solved by the Invention

Both of the optical glasses disclosed in Patent Documents 1 and 2 have excellent optical properties, while the following improvements are desirable.

In the optical glass described in Patent Document 1, 13% by weight or more of $Ta_2O_5$ as a glass component is incorporated for rendering glass stability much excellent. However, a tantalum material is very expensive, and even when it is compared with rare earth oxides and transition metal oxides such as niobium oxide both of which are expensive among glass raw materials, it is outstandingly expensive. It is hence desirable to reduce the $Ta_2O_5$ content for suppressing an increase in a raw material cost and expanding use of high-refractivity low-dispersion optical glass.

In the optical glass described in Patent Document 2, the $Ta_2O_5$ component is reduced in amount, an increase in a raw material cost is suppressed, and the optical glass has good devitrification resistance for a glass having a small $Ta_2O_5$ content. However, when compared with a glass rich in $Ta_2O_5$, it is poor in devitrification resistance, so that devitrification is to be prevented by employing a special molding method. That is, a molten glass is cast into a mold with a through hole, and the glass is to be brought into contact with the inner circumference surface of the through hole to rapidly remove heat for preventing devitrification. A molded glass is withdrawn downward, cut and gradually cooled.

In molding a glass, generally, there is employed a method in which molten glass is continuously cast into a mold having a withdrawal outlet for withdrawing molded glass, in part of a side surface, and a molded glass is withdrawn in the horizontal direction from the withdrawal outlet. In this method, withdrawn glass can be introduced into a continuous annealing furnace and gradually cooled without cutting it, and this method is efficient as compared with a molding method using a mold having a through hole.

If a glass having the $Ta_2O_5$ component reduced can be improved in devitrification resistance like a Ta-rich glass, a glass having a low raw material cost can be efficiently produced, which will be significant for expanding use of a high-refractivity low-dispersion optical glass.

It is an object of this invention to provide a high-refractivity low-dispersion optical glass that is excellent in devitrification resistance with suppressing the $Ta_2O_5$ content, a press-molding glass material formed of the above glass, an optical element and a process for producing the optical element.

Means to Solve the Problems

This invention has been made for overcoming the above problems, and provides (1) an optical glass comprising, by mass %,
1 to 30% of $B_2O_3$,
0.1 to 20% of $SiO_2$,
55 to 75% of a total of $La_2O_3$, $Gd_2O_3$, $Y_2O_3$ and $Yb_2O_3$,
the content of $La_2O_3$ being 15 to 55%, the mass ratio of the content of $Gd_2O_3$ to the total content of $La_2O_3$, $Gd_2O_3$, $Y_2O_3$ and $Yb_2O_3$, $(Gd_2O_3/La_2O_3+Gd_2O_3+Y_2O_3+Yb_2O_3)$, being 0.17 to 0.65,
0 to 13% of $Ta_2O_5$ (exclusive of 13%), and
0 to 25% of a total of $Nb_2O_5$, $TiO_2$, $WO_3$ and $ZrO_2$, the content of $Nb_2O_5$ being less than 10%, and
having a refractive index nd of 1.83 to 1.92 and an Abbe's number vd of 36 to 45, (2) the optical glass of the above (1), which has an refractive index nd and an Abbe's number vd that satisfy the following expression (1), $$nd \geq 2.2017 - 0.0083 \times vd \quad (1),$$

(3) the optical glass of the above (1) or (2), which has a liquidus temperature of 1,300° C. or lower, (4) the optical glass of any one of the above (1) to (3), which contains 10 to 40% of $Gd_2O_3$, 0 to 25% of $Y_2O_3$ and 0 to 5% of $Yb_2O_3$, (5) a press-molding glass material formed of the optical glass recited in any one of the above (1) to (4), (6) an optical element formed of the optical glass recited in any one of the above (1) to (4), and (7) a process for producing an optical element, which comprises heating the press-molding glass material recited in the above (5) to soften it, press-molding the softened glass material to produce an optical element blank and grinding and polishing said blank.

Effect of the Invention

According to this invention, there can be provided a high-refractivity low-dispersion optical glass excellent in devitrification resistance with the $Ta_2O_5$ content reduced, a press-molding glass material formed of the above glass, an optical element, and a process for producing the optical element.

EMBODIMENT FOR PRACTICING THE INVENTION

I. Optical Glass

The optical glass of this invention is a high-refractivity low-dispersion glass, and has optical properties suitable as a lens material that can be combined with a lens formed of a high-refractivity high-dispersion glass in order to constitute a compact chromatic aberration correcting optical system, i.e., a refractive index nd and an Abbe's number vd that satisfy the following expressions (a) and (b), $$36 \leq vd \leq 45 \quad (a)$$

$$1.83 \leq nd \leq 1.92 \quad (b)$$

For materializing the above optical properties, it is required to limit the contents of $Nb_2O_5$, $TiO_2$, $WO_3$ and $ZrO_2$ that are effective for higher refractivity but work to increase dispersion. For maintaining low dispersion property and at the same time increasing refractivity, the total content of rare earth oxides such as $La_2O_3$, $Gd_2O_3$, $Y_2O_3$, etc., as components to impart high-refractivity low-dispersion is to be increased. However, when the total content of rare earth oxides is simply increased with limiting the $Ta_2O_5$ content, the thermal stability of a glass is greatly impaired. The present inventors therefore have found that the excellent glass stability can be maintained even if the total content of rare earth oxides is increased with limiting the $Ta_2O_5$ content, by introducing a plurality of species of rare earth oxides as glass components and optimizing the allocation of these components, and this invention has been accordingly completed.

That is, the optical glass of this invention is an optical glass comprising, by mass %, 1 to 30% of $B_2O_3$,
0.1 to 20% of $SiO_2$,
55 to 75% of a total of $La_2O_3$, $Gd_2O_3$, $Y_2O_3$ and $Yb_2O_3$, the content of $La_2O_3$ being 15 to 55%, the mass ratio of the content of $Gd_2O_3$ to the total content of $La_2O_3$, $Gd_2O_3$, $Y_2O_3$ and $Yb_2O_3$, ($Gd_2O_3/La_2O_3+Gd_2O_3+Y_2O_3+Yb_2O_3$), being 0.17 to 0.65,
0 to 13% of $Ta_2O_5$ (exclusive of 13%), and
0 to 25% of a total of $Nb_2O_5$, $TiO_2$, $WO_3$ and $ZrO_2$, the content of $Nb_2O_5$ being less than 10%, and
having a refractive index nd of 1.83 to 1.92 and an Abbe's number vd of 36 to 45.

[Composition of Optical Glass]

The composition of the optical glass of this invention will be explained in detail. Contents and total contents of glass components by % hereinafter stand for contents or total contents by mass % unless otherwise specified, and ratios of the content of a glass component to total contents stand for a ratio by mass. Further, being a predetermined value or less or being a predetermined value or more is to mean that a predetermined value is also included.

$B_2O_3$ is a component for forming a glass network, and works to improve the thermal stability of a glass. When the content thereof is less than 1%, liquidus temperature increases, and moldability during the molding of a glass melt is deteriorated. When the above content exceeds 30%, it is made difficult to obtain a prescribed refractive index. The content of $B_2O_3$ is hence limited to 1 to 30%. The content of $B_2O_3$ is preferably in the range of 2 to 25%, more preferably in the range of 3 to 22%, still more preferably in the range of 5 to 20%, yet more preferably in the range of 7 to 17%.

$SiO_2$ is a component for forming a glass network, and has the effect of improving the thermal stability of a glass and the effect of bringing the viscosity of a glass melt into a range suitable for molding. When the content thereof is less than 0.1%, it is difficult to produce the above effects. When it exceeds 20%, liquidus temperature increases, and it is difficult to mold a glass melt. It is also difficult to obtain a prescribed refractive index. The content of $SiO_2$ is hence limited to 0.1 to 20%. The content of $SiO_2$ is preferably in the range of 0.1 to 17%, more preferably in the range of 1 to 15%, still more preferably in the range of 2 to 13%, yet more preferably in the range of 3 to 10%.

$La_2O_3$, $Gd_2O_3$, $Y_2O_3$ and $Yb_2O_3$ are components that increase refractivity while maintaining low dispersion property. When the total content of $La_2O_3$, $Gd_2O_3$, $Y_2O_3$ and $Yb_2O_3$ is less than 55%, it is difficult to obtain the prescribed optical properties. When it exceeds 75%, devitrification resistance is deteriorated, liquidus temperature is increased, and the moldability of a glass melt is deteriorated. The total content of $La_2O_3$, $Gd_2O_3$, $Y_2O_3$ and $Yb_2O_3$ is hence limited to 55 to 75%. The total content of $La_2O_3$, $Gd_2O_3$, $Y_2O_3$ and $Yb_2O_3$ is preferably in the range of 55.5 to 72.5%, more preferably in the range of 56 to 72.5%, still more preferably in the range of 56.5 to 70%, yet more preferably in the range of 57 to 70%, further more preferably in the range of 57.5 to 70%, still further more preferably in the range of 58 to 67.5%, yet more preferably in the range of 58.5 to 65%, particularly preferably in the range of 59 to 65%.

Of the above rare earth oxides, $La_2O_3$ is an essential component for obtaining prescribed optical properties, since the thermal stability of a glass is not impaired when it is introduced even in a relatively large amount. When the content of $La_2O_3$ is less than 15%, it is difficult to materialize the prescribed optical properties while maintaining the thermal stability of a glass. When the above content exceeds 55%, devitrification resistance is deteriorated, liquidus temperature is also increased, and the moldability of a glass melt is deteriorated. The content of $La_2O_3$ is hence limited to 15 to 55%. The content of $La_2O_3$ is preferably in the range of 17 to 52.5%, more preferably in the range of 20 to 50%, still more preferably in the range of 25 to 45%, yet more preferably in the range of 30 to 40%.

When the total content of $La_2O_3$, $Gd_2O_3$, $Y_2O_3$ and $Yb_2O_3$ is simply adjusted to the above range for reducing the content of $Ta_2O_5$ and at the same time achieving high-refractivity low-dispersion, the thermal stability of a glass is impaired to a great extent. In the optical glass of this invention, therefore, the ratio of content of $Gd_2O_3$ to the total content of $La_2O_3$, $Gd_2O_3$, $Y_2O_3$ and $Yb_2O_3$, $Gd_2O_3/(La_2O_3+Gd_2O_3+Y_2O_3+Yb_2O_3)$, is limited to the range of 0.17 to 0.65. When the ratio of $Gd_2O_3/(La_2O_3+Gd_2O_3+Y_2O_3+Yb_2O_3)$ is outside the above range, the thermal stability of a glass is deteriorated, the devitrification resistance is decreased, the liquidus temperature is increased, and the moldability of a glass melt is decreased to a great extent.

For improving the devitrification resistance and the moldability of a glass melt, the ratio of $Gd_2O_3/(La_2O_3+Gd_2O_3+Y_2O_3+Yb_2O_3)$ is preferably in the range of 0.2 to 0.55, more preferably in the range of 0.25 to 0.5, still more preferably in the range of 0.3 to 0.5, yet more preferably in the range of 0.31 to 0.45, further more preferably in the range of 0.33 to 0.45.

When $Gd_2O_3$ as a glass component is co-present with $La_2O_3$ as described above, $Gd_2O_3$ works to improve the thermal stability, to decrease the liquidus temperature and to improve the moldability of a glass melt, and the content thereof is preferably 10 to 40%. For producing the above effects, the lower limit of content of $Gd_2O_3$ is preferably 10%, more preferably 11%, still more preferably 13%, yet more preferably 16%, further more preferably 19%. When the content of $Gd_2O_3$ is over 40%, the thermal stability and devitrification resistance of a glass tend to decrease, and the liquidus temperature tends to increase. Therefore, the upper limit of content of $Gd_2O_3$ is preferably 40%, more preferably 35%, still more preferably 32.5%, yet more preferably 30%, further more preferably 25%.

$Y_2O_3$ is also a component effective for achieving high-refractivity low-dispersion, and the content thereof is preferably 0 to 25%. When the content thereof exceeds 25%, the thermal stability and devitrification resistance of a glass tend to decrease, and the liquidus temperature tends to increase. Therefore, the upper limit of content of $Y_2O_3$ is preferably 25%, more preferably 20%, still more preferably 16%, yet more preferably 12%, further more preferably 8% or less. $Y_2O_3$ works to maintain high-refractivity low-dispersion properties and at the same time works to improve the thermal stability and devitrification resistance of a glass and to decrease the liquidus temperature, so that the lower limit of content of $Y_2O_3$ is preferably 1%, more preferably 2%.

$Yb_2O_3$ is also a component effect for achieving high-refractivity low-dispersion, and the content thereof is preferably C to 5%. When the content thereof exceeds 5%, the thermal stability and devitrification resistance of a glass tend to decrease, and the liquidus temperature tends to increase. Therefore, the upper limit of content of $Yb_2O_3$ is preferably 5%, more preferably 3%, still more preferably 1%, yet more preferably 0.5%. As compared with $Gd_2O_3$ and $Y_2O_3$, $Yb_2O_3$ less contributes to the improvement of thermal stability of a glass, and is also an expensive component, so that the content thereof may be zero.

$Ta_2O_5$ relatively maintains low dispersion without increasing liquidus temperature and works to increase refractivity. Since, however, it is outstandingly expensive as compared with other components, it is desirable to reduce its use amount. The optical glass of this invention can maintain the prescribed optical properties and excellent glass stability and devitrification resistance even when the content of $Ta_2O_5$ is limited to less than 13%, so that the content thereof is limited to 0 to 13% (exclusive of 13%) from the view point of a decrease in a cost. The upper limit of content of $Ta_2O_5$ is preferably 11%, more preferably 10%, still more preferably 9%, yet more preferably 8%, and the content thereof can be limited to 1% or less, or can be limited to zero. However, when a small amount of $Ta_2O_5$ is incorporated, the thermal stability of a glass is improved while the high-refractivity low-dispersion properties are maintained. Therefore, the lower limit of content of $Ta_2O_5$ is preferably 1%, more preferably 2%, still more preferably 3%.

$Nb_2O_5$, $TiO_2$, $WO_3$ and $ZrO_2$ increase refractivity, while they work to increase dispersion. For achieving high-refractivity low-dispersion properties, the total content of $Nb_2O_5$, $TiO_2$, $WO_3$ and $ZrO_2$ is limited to 0 to 25%. When the above total content exceeds 25%, it is difficult to obtain a desired dispersion, and the thermal stability of a glass is also decreased. For maintaining low dispersion and the thermal stability of a glass, the upper limit of total content of $Nb_2O_5$, $TiO_2$, $WO_3$ and $ZrO_2$ is preferably 22.5%, more preferably 20%, still more preferably 17.5 yet more preferably 15%. $Nb_2O_5$, $TiO_2$, $WO_3$ and $ZrO_2$ are components effective for increasing refractivity while maintaining the thermal stability of a glass when they are used in proper amounts, so that the lower limit of total content of $Nb_2O_5$, $TiO_2$, $WO_3$ and $ZrO_2$ is preferably 2.5%, more preferably 5%, still more preferably 7.5%.

When the content of $Nb_2O_5$ is 10% or more even when the above total content is within the above range, the devitrification resistance is decreased, the liquidus temperature is increased, and the moldability of a glass melt is deteriorated. The content of $Nb_2O_5$ is hence limited to less than 10%. The upper limit of content of $Nb_2O_5$ is preferably 8%, more preferably 6%, still more preferably 5.5%, yet more preferably 5%, further more preferably 4.5%, still further more preferably 4%. When used in a proper amount, $Nb_2O_5$ works to improve the thermal stability of a glass and to decrease liquidus temperature while increasing refractivity, so that the lower limit of content of $Nb_2O_5$ is preferably 0.5%, more preferably 1%.

When incorporated in a proper amount, $TiO_2$ improves the thermal stability of a glass and works to increase refractivity while decreasing liquidus temperature. When $TiO_2$ is incorporated to excess, however, the thermal stability of a glass is deteriorated, liquidus temperature is increased, transmittance on a short wavelength side of a visible light region is decreased, and a glass tends to be colored, so that it is preferred to adjust the content of $TiO_2$ to 0 to 12%. The upper limit of content of $TiO_2$ is preferably 12%, more preferably 10%, still more preferably 8%, yet more preferably 6%, further more preferably 4%. The lower limit of content of $TiO_2$ is preferably 0.5%.

$WO_3$ works to increase refractivity. When the content thereof exceeds 16%, however, the thermal stability of a glass is deteriorated, liquidus temperature is increased, transmittance on a short wavelength side of a visible light region is decreased, and a glass tends to be colored. The content of $WO_3$ is hence preferably 0 to 16%, more preferably 0 to 14%, still more preferably 0 to 12%, yet more preferably 0 to 10%, further more preferably 0 to 5%.

When incorporated in a proper amount, $ZrO_2$ improves the thermal stability of a glass and works to increase refractivity while decreasing liquidus temperature. When $ZrO_2$ is incorporated to excess, however, the thermal stability of a glass is deteriorated, and liquidus temperature tends to increase. The content of $ZrO_2$ is hence preferably limited to 0 to 12%. The upper limit of content of $ZrO_2$ is preferably 11%, more preferably 10%, still more preferably 9%, yet more preferably 7%, and the lower limit of content of $ZrO_2$ is preferably 1%, more preferably 2%.

$Li_2O$, $Na_2O$ and $K_2O$ improve the meltability of a glass and work to improve press-moldability by decreasing glass transition temperature. When the content of each exceeds 10%, the thermal stability of a glass is decreased, liquidus temperature is increased, and refractivity is decreased. The content of each of the above components is preferably in the range of 0 to 10%, more preferably in the range of 0 to 7%, still more preferably in the range of 0 to 5%, yet more preferably in the range of 0 to 3%, further more preferably in the range of 0 to 0.5%. Still further more preferably, none of $Li_2O$, $Na_2O$ and $K_2O$ may be incorporated.

When incorporated in a proper amount, ZnO improves the thermal stability and meltability of a glass and works to improve press-moldability by decreasing glass transition temperature. When it is incorporated to excess, refractivity is decreased, dispersion is increased, the thermal stability and devitrification resistance of a glass are decreased, and liquidus temperature tends to increase. The content of ZnO is hence preferably limited to 0 to 15%. The upper limit of content of ZnO is preferably 12%, more preferably 9%, still more preferably 5%, yet more preferably 3%, and the lower limit thereof is more preferably 0.1%, still more preferably 0.5%, yet more preferably 1%.

BaO, SrO, CaO and MgO improve the meltability of a glass and work to improve press-moldability by decreasing glass transition temperature. However, when they are incorporated to excess, the thermal stability and devitrification resistance of a glass are decreased, and liquidus temperature tends to increase. The content of each of the above components is hence preferably in the range of 0 to 15%, more preferably in the range of 0 to 10%, still more preferably in the range of 0 to 7%, yet more preferably in the range of 0 to 5%, further more preferably in the range of 0 to 3%, still further more preferably in the range of 0 to 1%. Of BaO, SrO, CaO and MgO, the incorporation of BaO is advantageous for achieving high refractivity. It is hence desirable to make the content of BaO larger than the content of any one of SrO, CaO and MgO. None of BaO, SrO, CaO and MgO may be incorporated.

$Al_2O_3$ Contributes to the improvement of thermal stability of a glass and works to improve moldability by increasing the viscosity of a glass melt so long as it is incorporated in a small amount. However, when the content thereof exceeds 5%, the meltability and devitrification resistance tend to decrease.

The content of $Al_2O_3$ is hence preferably in the range of 0 to 5%, more preferably in the range of 0 to 3%, still more preferably in the range of 0 to 1%. No $Al_2O_3$ may be incorporated.

$Bi_2O_3$ works to increase refractivity. When it is incorporated to excess, however, transmittance on a short wavelength side of a visible light region is decreased, and a glass tends to be colored. The content thereof is hence preferably in the range of 0 to 5%, more preferably in the range of 0 to 3%, still more preferably in the range of 0 to 1%. No $Bi_2O_3$ may be incorporated.

$GeO_2$ and $Ga_2O_3$ work to increase refractivity. When it is incorporated to excess, however, the thermal stability and devitrification resistance of a glass are deteriorated, and liquidus temperature tends to increase. Further, since they are very expensive components, the content of each of the above components is preferably in the range of 0 to 5%, more preferably in the range of 0 to 1%, still more preferably in the range of 0 to 0.5%. None of $GeO_2$ and $Ga_2O_3$ may be incorporated.

$Sb_2O_3$, SnO and $CeO_2$ work to improve a clarification effect when they are incorporated in a small amount. However, when $Sb_2O_3$ is added in an amount of over 1%, clarity tends to decrease, and the deterioration of moldability is accelerated due to its high oxidizing action. The amount of $Sb_2O_3$ is preferably in the range of 0 to 1%, more preferably in the range of 0 to 0.5%. Further, the property of defoaming can be improved by introducing glass raw materials in the form of nitrates, carbonates and sulfates. It is useful to use $Sb_2O_3$, SnO and $CeO_2$ in combination, to use nitrates, carbonates and sulfates in combination, and also to use the above compounds singly.

When the amount of each of SnO and $CeO_2$ exceeds 5%, the thermal stability and devitrification resistance of a glass are deteriorated, and a glass tends to be colored. The amount of each is hence limited to the range of 0 to 5%. The amount of each of SnO and $CeO_2$ is preferably in the range of 0 to 3%, more preferably 0 to 2%, still more preferably in the range of 0 to 1%. None of these may be incorporated.

F broadens a composition range in which a glass can be formed, and it is a component effective for decreasing dispersion and decreasing glass transition temperature. When it is incorporated to excess, however, refractivity is decreased, the volatility of a glass melt is intensified, and when a glass melt is molded, striae occur, or the variance of refractivity caused by volatilization tends to be increased. When F is introduced into a glass, it can be introduced by replacement of O→2F (replacement of O with 2F). F can be introduced by using, as a raw material, $YF_3$, $LaF_3$, $YbF_3$, $ZrF_4$, $ZnF_2$ or a fluoride of an alkali metal or alkaline earth metal. The amount of F to be introduced can be considered on the basis of a mass percent of it in a glass when the total amount of the glass is 100 mass %. The content of F by mass % is preferably in the range of 0 to 10%, more preferably in the range of 0 to 8%, still more preferably in the range of 0 to 6%.

The optical glass of this invention materializes optical properties of high-refractivity low-dispersion while maintaining the thermal stability of the glass, and it is not necessary to incorporate components such as Lu, Hf and Ga. Since Lu, Hf and Ga are expensive components, the content of each of $Lu_2O_3$, $HfO_2$ and $Ga_2O_3$ is preferably limited to 0 to 1%, more preferably, to 0 to 0.5%, still more preferably, to 0 to 0.3%. Yet more preferably, $Lu_2O_3$ is not incorporated, $HfO_2$ is not incorporated, and $Ga_2O_2$ is not incorporated.

When detrimental effects on the environment are taken into account, it is preferred to introduce none of As, Pb, U, Th and Cd. Concerning Te, it is preferred to limit the content of $TeO_2$ to 0 to 1%, more preferably, to 0 to 0.5%, and it is preferred to incorporate no Te.

In order to utilize the excellent light transmittance of the glass to be described later, further, it is preferred to introduce none of substances that cause coloring, such as Cu, Cr, V, Fe, Ni, Co, Nd, etc.

[Optical Properties of Optical Glass]

The optical glass of this invention will be explained with regard to its properties.

The optical glass of this invention is a high-refractivity low-dispersion glass, and a lens formed of a high-refractivity low-dispersion is used in many cases in combination with a lens formed of a high-refractivity high-dispersion glass for correcting chromatic aberration. When an optical system for correcting chromatic aberration is constituted, the optical system can be downsized and functionally enhanced by decreasing the dispersion of a high-refractivity low-dispersion glass and increasing the refractivity thereof. The same is also true of other use than use of an optical element for correcting chromatic aberration, such as use of prism, etc.

However, when it is intended to achieve high refractivity and low dispersion at the same time, the thermal stability of a glass is decreased, and the production of an optical glass is difficult, which leads to difficulties in stably producing a high-quality optical glass by the above general method of molding a molten glass. When the upper limit of refractivity and the lower limit of Abbe's number vd are determined, therefore, it is essential to maintain the thermal stability of a glass.

In the optical glass of this invention, the refractive index nd is adjusted to 1.83 or more, and the Abbe's number vd is adjusted to 36 or more, from the viewpoint of imparting optical properties suitable for use thereof, and the refractive index nd is adjusted to 1.92 or less, and the Abbe's number vd is adjusted to 45 or less, from the viewpoint of maintaining the thermal stability of the glass. The refractive index nd is preferably in the range of 1.835 to 1.917, more preferably in the range of 1.84 to 1.915, still more preferably in the range of 1.85 to 1.91, yet more preferably in the range of 1.86 to 1.9, further more preferably in the range of 1.87 to 1.9, still further more preferably in the range of 1.875 to 1.9.

In a optical constant map (optical property chart) that is generally used in the technical field of art which this invention comes under, an ordinate axis indicates refractivity, an abscissa axis indicates Abbe's number, and Abbe's numbers vd and refractive indexes are plotted. In the optical constant map, conventionally, an upper portion of the ordinate axis is a high refractivity side, a lower portion is a low refractivity side, a leftward portion is a low dispersion side, and a rightward portion is a high dispersion side.

As a high-refractivity low-dispersion region, the optical properties of a glass are set on the leftward upper portion of the optical constant map, and the glass has high utility as an optical element material. From the above viewpoint, the refractive index nd and Abbe's number vd of the optical glass of this invention preferably satisfy the following expression (1), more preferably satisfy the following expression (2), and still more preferably satisfy the following expression (3).

$$nd \geq 2.20170 - 0.0083 \times vd \quad (1)$$

$$nd \geq 2.20580 - 0.0083 \times vd \quad (2)$$

$$nd \geq 2.21000 - 0.0083 \times vd \quad (3)$$

On the other hand, when the optical properties of a glass are set on the leftward upper portion of the optical constant map, the thermal stability of the glass tends to decrease. From the viewpoint of maintaining thermal stability, the optical glass of this invention preferably satisfies the following expression (4), more preferably satisfies the following expression (5), still more preferably satisfies the following expression (6), yet more preferably satisfies the following expression (7), further more preferably satisfies the following expression (8).

$$nd \leq 2.22700 - 0.0083 \times vd \quad (4)$$

$$nd \leq 2.22500 - 0.0083 \times vd \quad (5)$$

$$nd \leq 2.22400 - 0.0083 \times vd \quad (6)$$

$$nd \leq 2.22300 - 0.0083 \times vd \quad (7)$$

$$nd \leq 2.22200 - 0.0083 \times vd \quad (8)$$

[Liquidus Temperature of Optical Glass]

The liquidus temperature of the optical glass of this invention will be explained below.

The optical glass of this invention preferably has a liquidus temperature of 1,300° C. or lower, and a glass molded product having high quality can be produced from a molten glass by a general method. For example, a mold having an opening portion from which a glass molded inside is withdrawn on a side surface is used, a molten glass is continuously cast into the mold from an upper portion to be molded, and the molded glass is continuously withdrawn in the horizontal direction from the above opening portion. The withdrawn glass is caused to pass inside a continuously gradually cooling furnace called "Lehr" to anneal it, and a forward end portion of the glass molded product that moves past the inside of the above furnace is cut or split to a desired length.

A molten glass that is to be cast into the mold is caused to flow out along a pipe from a crucible. For preventing the devitrification of a glass, the temperature of a molten glass is maintained at a temperature higher than the liquidus temperature and rapidly cooled, or a molten glass maintained at a temperature higher than the liquidus temperature is temperature-decreased to a temperature around the liquidus temperature immediately before it is caused to flow out, caused to flow out and rapidly cooled.

When the liquidus temperature is higher than 1,300° C., it is inevitably required to render the glass temperature high, volatilization from the high-temperature glass surface is increased, the viscosity is decreased, and it is made difficult to mold a high-quality glass by the above general method, According to the optical glass of this invention, the liquidus temperature is low for a high-refractivity low-dispersion glass, so that a high-quality glass can be stably produced with excellent productivity.

In this invention, the liquidus temperature is preferably in the range of 1,280° C. or lower, more preferably in the range of 1,260° C. or lower. The lower limit of the liquidus temperature is not specially limited so long as desired optical properties can be obtained, while the lower limit of the liquidus temperature is preferably 1,100° C. for achieving higher-refractivity lower-dispersion in the above range.

[Glass Transition Temperature]

A preferred embodiment of the optical glass of this invention is a glass having a glass transition temperature of 800° C. or lower. When the glass transition temperature is adjusted to 800° C. or lower, the increase of the annealing temperature for a molded glass can be inhibited, so that the lifetime of the gradually cooling furnace can be extended. Further, when a glass is press-molded by re-heating and softening it, the heating temperature can be suppressed to be relatively low, so that the lifetime of a press-molding apparatus can be extended.

The upper limit of the glass transition temperature is preferably 780° C., more preferably 750° C., still more preferably 740° C.

When the glass transition temperature is decreased to excess, thermal stability tends to decrease. The lower limit of the glass transition temperature is hence preferably 650° C., more preferably 660° C., still more preferably 670° C.

(Transmittance Characteristic)

The optical glass of this invention exhibits high transmittance in the entire visible light region. In a wavelength region of 280 nm to 700 nm, the wavelength at which a polished glass having a thickness of 10±0.1 mm has a spectral transmittance (including surface reflection loss) of 80%, 70% or 5% is supposed to be $\lambda 80$, $\lambda 70$ or $\lambda 5$.

In a wavelength region of $\lambda 80$ to 700 nm, the spectral transmittance is 80% or more, in a wavelength of $\lambda 70$ to 700 nm, the spectral transmittance is 70% or more, and in a wavelength region of $\lambda 5$ to 700 nm, the spectral transmittance is 5% or more.

In the optical glass of this invention, $\lambda 80$ is preferably in the region of 400 to 600 nm, more preferably in the region of 430 to 540 nm. $\lambda 70$ is preferably in the region of 300 to 500 nm, more preferably in the region of 360 to 460 nm. $\lambda 5$ is preferably in the region of 300 to 400 nm, more preferably in the region of 320 to 360 nm.

[Process for Producing Optical Glass]

The process for producing an optical glass, provided by this invention, will be explained below. For example, compound raw materials in the form of a powder or cullet raw materials are weighed and prepared to satisfy an intended glass composition, they are fed into a melting vessel made of platinum alloy, and then they are melted under heat. After the above raw materials are completely melted to form a glass, and a molten glass is temperature-increased to clarify it. A clarified molten glass is temperature-decreased, homogenized by stirring it with a stirrer, continuously supplied to a glass flow-out pipe, caused to flow out, rapidly cooled and molded to obtain a homogeneous glass molded product.

II. Press-Molding Glass Material

The press-molding glass material of this invention will be explained below.

The press-molding glass material of this invention is characteristically formed of the above optical glass of this invention. The glass material is formed in a form suitable for press-molding depending upon the form of an intended press-molded article. Further, the mass of the glass material is so set as to satisfy the mass of a press-molded article. In this invention, the optical glass to be used is excellent in stability, so that the glass resists devitrification even when it is press-molded by re-heating and softening it, and high-quality molded articles can be stably produced.

An embodiment of preparation of the press-molding glass material will be as follows.

A molten glass flowing out of a flow-out pipe is continuously cast into a mold that is horizontally placed below the flow-out pipe, to be molded into a plate form having a constant thickness. The molded glass is withdrawn in the horizontal direction from an opening portion provided in a mold side surface. The glass molded material in the form of a plate is withdrawn by means of a belt conveyor. The glass molded material is withdrawn at a constant withdrawing speed of the belt conveyor such that it has a constant plate thickness, whereby the glass molded material obtained has a predetermined thickness and a plate width. The glass molded material is carried into a gradually cooling furnace by means of a belt conveyor and annealed. The annealed glass molded material is cut or split in the plate thickness direction, and cut or split pieces are polished or barrel-polished to form press-molding glass materials in the form of a gob each.

III. Optical Element

The optical element of this invention will be explained below.

The optical element of this invention is characteristically formed of the above optical glass of this invention. The optical element of this invention has high-refractivity low-dispersion properties, and there can be provided optical elements having optically high values such as various lenses and prisms at a low cost.

Examples of the lenses include various lenses of which the lens surfaces are spherical or aspherical, such as a concave meniscus lens, a convex meniscus lens, a biconvex lens, a biconcave lens, a plano-convex lens, a plano-concave lens, etc.

When such a lens is combined with a lens formed of a high-refractivity high-dispersion glass, chromatic aberration can be corrected, and it is hence suitable as a lens for correcting chromatic aberration. Further, it is a lens effective for downsizing an optical system.

The prism has high refractivity. When it is incorporated into an image-sensing optical system, the light path is bent to turn it in a desired direction, and there can be materialized an optical system having a compact and wide angle of view.

The optical function surface of the optical element of this invention may be provided with a film for controlling a light transmittance, such as an anti-reflection film, etc.

IV. Process for Producing Optical Element

First, an optical element blank having a form similar to the form of an intended optical element and a processing margin is produced by press-molding the above press-molding glass material by heating and softening it.

When the optical element blank is produced, there is prepared a press mold having molding surfaces in a form that is obtained by reversing the form of the above blank. The press mold is composed of mold members including an upper mold member, a lower mold member and, optionally, a sleeve member, and the molding surfaces of the upper and lower mold members are prepared in the above form, or when the sleeve member is used, the molding surface of the sleeve member is prepared in the above form.

Then, a powder release agent such as boron nitride is uniformly applied to the surface of the press-molding glass material. And, the press-molding glass material is heated to soften it and then introduced onto the lower mold member that is pre-heated, and it is pressed with the upper mold member facing the lower mold member to mold it into an optical element blank.

Then, the optical element blank is released from the press mold and taken out, and it is annealed. The annealing treatment is carried out to reduce a strain inside the glass and to bring optical properties such as a refractive index, etc., into desired values.

For glass gob heating conditions, press-molding conditions, materials to be used for the press mold, known conditions and materials can be employed. The above can be carried out in atmosphere.

Then, the optical element blank is ground and polished to produce an optical element. For the grinding and polishing, known methods can be employed.

EXAMPLE

This invention will be explained further in detail hereinafter, while this invention shall not in the least be limited by these Examples.

Example 1

Carbonates, nitrates, hydroxides, oxides, boric acid, etc., were used as raw materials for obtaining glasses Nos. 1 to 59 having compositions shown in Tables 1 to 10, and powders of the raw materials were weighed and fully mixed to obtain formulated raw materials. These formulated raw materials were placed in a crucible made of platinum, heated at 1,400° C., melted, clarified and stirred to give homogeneous molten glasses. These molten glasses were cast into a pre-heated mold and rapidly cooled, and they were held at a temperature around their glass transition temperatures for 2 hours and then gradually cooled to give various optical glasses. No precipitation of a crystal was found in any one of the glasses.

The glasses were measured for properties by the following methods. Tables 1 to 10 show measurement results.

(1) Refractive index nd and Abbe's number νd

An optical glass obtained by cooling it at a temperature decrease rate of 30° C./hour was measured.

(2) Glass transition temperature Tg

An optical glass was measured with a thermo-mechanical analyzer under the condition of a temperature elevation rate of 10° C./minute.

(3) Liquidus temperature LT

About 5 cc of a glass cooled to room temperature was placed in a platinum crucible, the crucible was placed in a furnace of which the internal temperature was equalized to a predetermined temperature, the setting temperature of the furnace was set at a predetermined temperature, the crucible was held therein for 2 hours, then the crucible was taken out of the furnace, and the glass was observed for crystallization and quality alteration. The setting temperature in the furnace was changed at intervals of 5° C., the above operation was repeated, and a lowest setting temperature at which the crystallization and quality alteration were not found was taken as a liquidus temperature. The crystallization and quality alteration were recognized by observation through an optical microscope of 100 magnifications. The quality alteration means that a foreign matter (crystallite, etc.) was generated.

(4) Specific gravity

Measured with an Archimedean method.

TABLE 1

| | | Glass No. | | | | | |
|---|---|---|---|---|---|---|---|
| | | 1 | 2 | 3 | 4 | 5 | 6 |
| Composition (mass %) | $B_2O_3$ | 14.07 | 14.17 | 13.88 | 14.04 | 14.31 | 15.11 |
| | SiO2 | 6.65 | 6.70 | 6.56 | 6.64 | 6.77 | 7.14 |
| | $GeO_2$ | 0.00 | 0.00 | 0.00 | 0.00 | 0.00 | 0.00 |

TABLE 1-continued

|  |  | Glass No. | | | | | |
|---|---|---|---|---|---|---|---|
|  |  | 1 | 2 | 3 | 4 | 5 | 6 |
|  | $La_2O_3$ | 37.10 | 44.07 | 25.14 | 37.37 | 34.46 | 25.98 |
|  | $Gd_2O_3$ | 22.45 | 15.18 | 34.94 | 22.64 | 20.86 | 15.73 |
|  | $Y_2O_3$ | 0.38 | 0.38 | 0.38 | 0.00 | 3.90 | 15.25 |
|  | $Yb_2O_3$ | 0.00 | 0.00 | 0.00 | 0.00 | 0.00 | 0.00 |
|  | $Nb_2O_5$ | 2.74 | 2.76 | 2.70 | 2.73 | 2.79 | 2.94 |
|  | $TiO_2$ | 2.19 | 2.21 | 2.16 | 2.19 | 2.23 | 2.35 |
|  | $WO_3$ | 0.00 | 0.00 | 0.00 | 0.00 | 0.00 | 0.00 |
|  | $ZrO_2$ | 5.89 | 5.94 | 5.82 | 5.88 | 6.00 | 6.33 |
|  | $Ta_2O_5$ | 6.51 | 6.56 | 6.43 | 6.50 | 6.63 | 7.00 |
|  | ZnO | 2.02 | 2.03 | 1.99 | 2.01 | 2.05 | 2.17 |
|  | $Li_2O$ | 0.00 | 0.00 | 0.00 | 0.00 | 0.00 | 0.00 |
|  | BaO | 0.00 | 0.00 | 0.00 | 0.00 | 0.00 | 0.00 |
|  | $Sb_2O_3$ | 0.00 | 0.00 | 0.00 | 00.00 | 0.00 | 0.00 |
|  | Total | 100.00 | 100.00 | 100.00 | 100.00 | 100.00 | 100.00 |
|  | RE | 59.93 | 59.63 | 60.46 | 60.01 | 59.22 | 56.96 |
|  | $Gd_2O_3$/RE | 0.375 | 0.255 | 0.578 | 0.377 | 0.352 | 0.276 |
|  | $Nb_2O_5 + TiO_2 + WO_3 + ZrO_2$ | 10.82 | 10.91 | 10.68 | 10.80 | 11.02 | 11.62 |
|  | $B_2O_3 + SiO_2 + GeO_2$ | 20.72 | 20.87 | 20.44 | 20.68 | 21.08 | 22.25 |
|  | $B_2O_3 + SiO_2$ | 20.72 | 20.87 | 20.44 | 20.68 | 21.08 | 22.25 |
|  | $B_2O_3/(B_2O_3 + SiO_2)$ | 0.67905 | 0.67897 | 0.67906 | 0.67892 | 0.67884 | 0.6791 |
| Properties | nd | 1.86883 | 1.86956 | 1.86684 | 1.86889 | 1.8652 | 1.85456 |
|  | vd | 40.34 | 40.31 | 40.37 | 40.3 | 40.37 | 40.67 |
|  | $2.20170 - 0.0083 \times vd$ | 1.86688 | 1.86713 | 1.86663 | 1.86721 | 1.86663 | 1.86414 |
|  | $2.20580 - 0.0083 \times vd$ | 1.87098 | 1.87123 | 1.87073 | 1.87131 | 1.87073 | 1.86824 |
|  | $2.21000 - 0.0083 \times vd$ | 1.87518 | 1.87543 | 1.87493 | 1.87551 | 1.87493 | 1.87244 |
|  | $2.22700 - 0.0083 \times vd$ | 1.89218 | 1.89243 | 1.89193 | 1.89251 | 1.89193 | 1.88944 |
|  | $2.22500 - 0.0083 \times vd$ | 1.89018 | 1.89043 | 1.88993 | 1.89051 | 1.88993 | 1.88744 |
|  | $2.22400 - 0.0083 \times vd$ | 1.88918 | 1.88943 | 1.88893 | 1.88951 | 1.88893 | 1.88644 |
|  | $2.22300 - 0.0083 \times vd$ | 1.88818 | 1.88843 | 1.88793 | 1.88851 | 1.88793 | 1.88544 |
|  | $2.22200 - 0.0083 \times vd$ | 1.88718 | 1.88743 | 1.88693 | 1.88751 | 1.88693 | 1.88444 |
|  | Liquidus temparature (° C.) | 1200 | 1220 | 1220 | 1200 | 1200 | 1240 |
|  | Glass transition temparature (° C.) | 704.2 | 700.2 | 710.3 | 704.5 | 706.1 | 709.4 |
|  | λ80 (nm) | 455 | — | 452 | 464 | 459 | 467 |
|  | λ70 (nm) | 386 | — | 387 | 391 | 390 | 388 |
|  | λ5 (nm) | 340 | 341 | 341 | 341 | 341 | 341 |
|  | Density (g/cm³) | 5.207 | 5.137 | 5.326 | 5.211 | 5.132 | 4.909 |

(Note)
RE = $La_2O_3 + Gd_2O_3 + Y_2O_3 + Yb_2O_3$

TABLE 2

|  |  | Glass No. | | | | | |
|---|---|---|---|---|---|---|---|
|  |  | 7 | 8 | 9 | 10 | 11 | 12 |
| Composition (mass %) | $B_2O_3$ | 13.43 | 12.97 | 11.24 | 12.46 | 12.54 | 12.31 |
|  | SiO2 | 6.68 | 6.46 | 6.26 | 6.46 | 6.50 | 6.38 |
|  | $GeO_2$ | 0.00 | 0.00 | 0.00 | 0.00 | 0.00 | 0.00 |
|  | $La_2O_3$ | 37.64 | 38.47 | 37.42 | 36.23 | 36.46 | 35.80 |
|  | $Gd_2O_3$ | 22.80 | 23.29 | 22.63 | 21.94 | 22.07 | 21.67 |
|  | $Y_2O_3$ | 0.00 | 0.00 | 4.23 | 4.10 | 4.12 | 4.05 |
|  | $Yb_2O_3$ | 0.00 | 0.00 | 0.00 | 0.00 | 0.00 | 0.00 |
|  | $Nb_2O_5$ | 2.75 | 2.66 | 2.58 | 2.66 | 2.68 | 2.63 |
|  | $TiO_2$ | 2.20 | 2.13 | 2.06 | 2.13 | 2.14 | 2.10 |
|  | $WO_3$ | 0.00 | 0.00 | 0.00 | 0.00 | 0.00 | 0.00 |
|  | $ZrO_2$ | 5.92 | 5.73 | 5.55 | 5.73 | 5.15 | 6.87 |
|  | $Ta_2O_5$ | 6.55 | 6.33 | 6.13 | 6.33 | 6.37 | 6.25 |
|  | ZnO | 2.03 | 1.96 | 1.90 | 1.96 | 1.97 | 1.94 |
|  | $Li_2O$ | 0.00 | 0.00 | 0.00 | 0.00 | 0.00 | 0.00 |
|  | BaO | 0.00 | 0.00 | 0.00 | 0.00 | 0.00 | 0.00 |
|  | $Sb_2O_3$ | 0.00 | 0.00 | 0.00 | 0.00 | 0.00 | 0.00 |
|  | Total | 100.00 | 100.00 | 100.00 | 100.00 | 100.00 | 100.00 |
|  | RE | 60.44 | 61.76 | 64.28 | 62.27 | 62.65 | 61.52 |
|  | $Gd_2O_3$/RE | 0.377 | 0.377 | 0.352 | 0.352 | 0.352 | 0.352 |
|  | $Nb_2O_5 + TiO_2 + WO_3 + ZrO_2$ | 10.87 | 10.52 | 10.19 | 10.52 | 9.97 | 11.60 |
|  | $B_2O_3 + SiO_2 + GeO_2$ | 20.11 | 19.43 | 17.50 | 18.92 | 19.04 | 18.69 |
|  | $B_2O_3 + SiO_2$ | 20.11 | 19.43 | 17.50 | 18.92 | 19.04 | 18.69 |

TABLE 2-continued

|  |  | Glass No. | | | | | |
|---|---|---|---|---|---|---|---|
|  |  | 7 | 8 | 9 | 10 | 11 | 12 |
| Properties | $B_2O_3/(B_2O_3 + SiO_2)$ | 0.66783 | 0.66752 | 0.64229 | 0.65856 | 0.65861 | 0.65864 |
|  | nd | 1.87367 | 1.87771 | 1.89077 | 1.88031 | 1.87884 | 1.88417 |
|  | vd | 40.13 | 40.13 | 39.87 | 40.34 | 40.18 | 39.94 |
|  | $2.20170 - 0.0083 \times vd$ | 1.86862 | 1.86862 | 1.87078 | 1.86688 | 1.86821 | 1.8702 |
|  | $2.20580 - 0.0083 \times vd$ | 1.87272 | 1.87272 | 1.87488 | 1.87098 | 1.87231 | 1.8743 |
|  | $2.21000 - 0.0083 \times vd$ | 1.87692 | 1.87692 | 1.87908 | 1.87518 | 1.87651 | 1.8785 |
|  | $2.22700 - 0.0083 \times vd$ | 1.89392 | 1.89392 | 1.89608 | 1.89218 | 1.89351 | 1.8955 |
|  | $2.22500 - 0.0083 \times vd$ | 1.89192 | 1.89192 | 1.89408 | 1.89018 | 1.89151 | 1.8935 |
|  | $2.22400 - 0.0083 \times vd$ | 1.89092 | 1.89092 | 1.89308 | 1.88918 | 1.89051 | 1.8925 |
|  | $2.22300 - 0.0083 \times vd$ | 1.88992 | 1.88992 | 1.89208 | 1.88818 | 1.88951 | 1.8915 |
|  | $2.22200 - 0.0083 \times vd$ | 1.88892 | 1.88892 | 1.89108 | 1.88718 | 1.88851 | 1.8905 |
|  | Liquidus temparature (° C.) | 1220 | 1240 | 1285 | 1250 | 1255 | 1260 |
|  | Glass transition temparature (° C.) | 706.6 | 709.8 | 732.2 | 719.4 | 719.9 | 718.9 |
|  | λ80 (nm) | 483 | 493 | 525 | 470 | 493 | 633 |
|  | λ70 (nm) | 392 | 400 | 417 | 404 | 405 | 411 |
|  | λ5 (nm) | 340 | 340 | 338 | 339 | 340 | 340 |
|  | Density (g/cm³) | 5.255 | 5.31 | 5.405 | 5.296 | 5.294 | 5.299 |

(Note)
$RE = La_2O_3 + Gd_2O_3 + Y_2O_3 + Yb_2O_3$

TABLE 3

|  |  | Glass No. | | | | | |
|---|---|---|---|---|---|---|---|
|  |  | 13 | 14 | 15 | 16 | 17 | 18 |
| Composition (mass %) | $B_2O_3$ | 12.33 | 12.89 | 11.10 | 11.78 | 13.14 | 13.81 |
|  | $SiO2$ | 6.39 | 6.68 | 7.67 | 7.06 | 5.86 | 5.26 |
|  | $GeO_2$ | 0.00 | 0.00 | 0.00 | 0.00 | 0.00 | 0.00 |
|  | $La_2O_3$ | 35.84 | 37.46 | 36.31 | 36.28 | 36.20 | 36.16 |
|  | $Gd_2O_3$ | 21.70 | 22.68 | 21.98 | 21.96 | 21.92 | 21.89 |
|  | $Y_2O_3$ | 4.05 | 4.24 | 4.10 | 4.10 | 4.09 | 4.09 |
|  | $Yb_2O_3$ | 0.00 | 0.00 | 0.00 | 0.00 | 0.00 | 0.00 |
|  | $Nb_2O_5$ | 2.63 | 2.75 | 2.67 | 2.66 | 2.66 | 2.66 |
|  | $TiO_2$ | 2.11 | 2.20 | 2.13 | 2.13 | 2.13 | 2.13 |
|  | $WO_3$ | 0.00 | 0.00 | 0.00 | 0.00 | 0.00 | 0.00 |
|  | $ZrO_2$ | 5.67 | 5.92 | 5.74 | 5.73 | 5.72 | 5.72 |
|  | $Ta_2O_5$ | 7.34 | 3.15 | 6.34 | 6.34 | 6.32 | 6.32 |
|  | ZnO | 1.94 | 2.03 | 1.96 | 1.96 | 1.96 | 1.96 |
|  | $Li_2O$ | 0.00 | 0.00 | 0.00 | 0.00 | 0.00 | 0.00 |
|  | BaO | 0.00 | 0.00 | 0.00 | 0.00 | 0.00 | 0.00 |
|  | $Sb_2O_3$ | 0.00 | 0.00 | 0.00 | 0.00 | 0.00 | 0.00 |
|  | Total | 100.00 | 100.00 | 100.00 | 100.00 | 100.00 | 100.00 |
|  | RE | 61.59 | 64.38 | 62.39 | 62.34 | 62.21 | 62.14 |
|  | $Gd_2O_3/RE$ | 0.352 | 0.352 | 0.352 | 0.352 | 0.352 | 0.352 |
|  | $Nb_2O_5 + TiO_2 + WO_3 + ZrO_2$ | 10.41 | 10.87 | 10.54 | 10.52 | 10.51 | 10.51 |
|  | $B_2O_3 + SiO_2 + GeO_2$ | 18.72 | 19.57 | 18.77 | 18.84 | 19.00 | 19.07 |
|  | $B_2O_3 + SiO_2$ | 18.72 | 19.57 | 18.77 | 18.84 | 19.00 | 19.07 |
|  | $B_2O_3/(B_2O_3 + SiO_2)$ | 0.65865 | 0.65866 | 0.59137 | 0.62527 | 0.69158 | 0.72417 |
| Properties | nd | 1.88247 | 1.87418 | 1.88145 | 1.88119 | 1.87946 | 1.87906 |
|  | vd | 39.93 | 40.75 | 40.07 | 40.24 | 40.23 | 40.29 |
|  | $2.20170 - 0.0083 \times vd$ | 1.87028 | 1.86348 | 1.86912 | 1.86771 | 1.86779 | 1.86729 |
|  | $2.20580 - 0.0083 \times vd$ | 1.87438 | 1.86758 | 1.87322 | 1.87181 | 1.87189 | 1.87139 |
|  | $2.21000 - 0.0083 \times vd$ | 1.87858 | 1.87178 | 1.87742 | 1.87601 | 1.87609 | 1.87559 |
|  | $2.22700 - 0.0083 \times vd$ | 1.89558 | 1.88878 | 1.89442 | 1.89301 | 1.89309 | 1.89259 |
|  | $2.22500 - 0.0083 \times vd$ | 1.89358 | 1.88678 | 1.89242 | 1.89101 | 1.89109 | 1.89059 |
|  | $2.22400 - 0.0083 \times vd$ | 1.89258 | 1.88578 | 1.89142 | 1.89001 | 1.89009 | 1.88959 |
|  | $2.22300 - 0.0083 \times vd$ | 1.89158 | 1.88478 | 1.89042 | 1.88901 | 1.88909 | 1.88859 |
|  | $2.22200 - 0.0083 \times vd$ | 1.89058 | 1.88378 | 1.88942 | 1.88801 | 1.88809 | 1.88759 |
|  | Liquidus temparature (° C.) | 1250 | 1265 | 1285 | 1270 | 1255 | 1255 |
|  | Glass transition temparature (° C.) | 714.8 | 716.2 | 723.5 | 724.6 | 714.6 | 712.1 |
|  | λ80 (nm) | 482 | 481 | 521 | 586 | 486 | — |
|  | λ70 (nm) | 400 | 407 | 410 | 412 | 398 | 447 |
|  | λ5 (nm) | 340 | 339 | 339 | 340 | 340 | 340 |
|  | Density (g/cm³) | 5.316 | 5.229 | 5.314 | 5.305 | 5.285 | 5.275 |

(Note)
$RE = La_2O_3 + Gd_2O_3 + Y_2O_3 + Yb_2O_3$

TABLE 4

| | | Glass No. | | | | | |
|---|---|---|---|---|---|---|---|
| | | 19 | 20 | 21 | 22 | 23 | 24 |
| Composition (mass %) | $B_2O_3$ | 12.63 | 12.30 | 12.45 | 11.97 | 12.30 | 12.30 |
| | SiO2 | 6.55 | 6.38 | 6.45 | 6.20 | 6.38 | 6.46 |
| | $GeO_2$ | 0.00 | 0.00 | 0.00 | 0.00 | 0.00 | 0.00 |
| | $La_2O_3$ | 36.71 | 35.76 | 36.18 | 34.78 | 35.75 | 36.25 |
| | $Gd_2O_3$ | 22.23 | 21.65 | 21.91 | 21.06 | 21.64 | 21.95 |
| | $Y_2O_3$ | 4.15 | 4.04 | 4.09 | 3.93 | 4.04 | 4.10 |
| | $Yb_2O_3$ | 0.00 | 0.00 | 0.00 | 0.00 | 0.00 | 0.00 |
| | $Nb_2O_5$ | 1.36 | 3.93 | 2.99 | 2.87 | 2.95 | 2.99 |
| | $TiO_2$ | 2.16 | 2.10 | 1.93 | 1.86 | 1.91 | 1.93 |
| | $WO_3$ | 0.00 | 0.00 | 0.00 | 0.00 | 0.00 | 0.00 |
| | $ZrO_2$ | 5.81 | 5.65 | 5.72 | 5.50 | 5.65 | 5.73 |
| | $Ta_2O_5$ | 6.41 | 6.25 | 6.32 | 6.08 | 6.25 | 6.33 |
| | ZnO | 1.99 | 1.94 | 1.96 | 5.75 | 3.13 | 1.96 |
| | $Li_2O$ | 0.00 | 0.00 | 0.00 | 0.00 | 0.00 | 0.00 |
| | BaO | 0.00 | 0.00 | 0.00 | 0.00 | 0.00 | 0.00 |
| | $Sb_2O_3$ | 0.00 | 0.00 | 0.00 | 0.00 | 0.00 | 0.00 |
| | Total | 100.00 | 100.00 | 100.00 | 100.00 | 100.00 | 100.00 |
| | RE | 63.09 | 61.45 | 62.18 | 59.77 | 61.43 | 62.30 |
| | $Gd_2O_3$/RE | 0.352 | 0.352 | 0.352 | 0.352 | 0.352 | 0.352 |
| | $Nb_2O_5 + TiO_2 + WO_3 + ZrO_2$ | 9.33 | 11.68 | 10.64 | 10.23 | 10.51 | 10.65 |
| | $B_2O_3 + SiO_2 + GeO_2$ | 19.18 | 18.68 | 18.90 | 18.17 | 18.68 | 18.76 |
| | $B_2O_3 + SiO_2$ | 19.18 | 18.68 | 18.90 | 18.17 | 18.68 | 18.76 |
| | $B_2O_3/(B_2O_3 + SiO_2)$ | 0.6585 | 0.65846 | 0.65873 | 0.65878 | 0.65846 | 0.65565 |
| Properties | nd | 1.87463 | 1.88562 | 1.88033 | 1.88111 | 1.88117 | 1.88174 |
| | vd | 41.02 | 39.48 | 40.22 | 39.96 | 40.09 | 40.17 |
| | 2.20170 − 0.0083 × vd | 1.86123 | 1.87402 | 1.86787 | 1.87003 | 1.86895 | 1.86829 |
| | 2.20580 − 0.0083 × vd | 1.86533 | 1.87812 | 1.87197 | 1.87413 | 1.87305 | 1.87239 |
| | 2.21000 − 0.0083 × vd | 1.86953 | 1.88232 | 1.87617 | 1.87833 | 1.87725 | 1.87659 |
| | 2.22700 − 0.0083 × vd | 1.88653 | 1.89932 | 1.89317 | 1.89533 | 1.89425 | 1.89359 |
| | 2.22500 − 0.0083 × vd | 1.88453 | 1.89732 | 1.89117 | 1.89333 | 1.89225 | 1.89159 |
| | 2.22400 − 0.0083 × vd | 1.88353 | 1.89632 | 1.89017 | 1.89233 | 1.89125 | 1.89059 |
| | 2.22300 − 0.0083 × vd | 1.88253 | 1.89532 | 1.88917 | 1.89133 | 1.89025 | 1.88959 |
| | 2.22200 − 0.0083 × vd | 1.88153 | 1.89432 | 1.88817 | 1.89033 | 1.88925 | 1.88859 |
| | Liquidus temparature (° C.) | 1265 | 1260 | 1250 | 1265 | 1240 | 1250 |
| | Glass transition temparature (° C.) | 715.8 | 717.4 | 718 | 696.2 | 708.4 | 717.9 |
| | λ80 (nm) | 587 | — | 499 | | 484 | 480 |
| | λ70 (nm) | 417 | 413 | 407 | | 397 | 394 |
| | λ5 (nm) | 339 | 341 | 340 | | 338 | 339 |
| | Density (g/cm³) | 5.296 | 5.29 | 5.302 | 5.317 | 5.305 | 5.305 |

(Note)
RE = $La_2O_3 + Gd_2O_3 + Y_2O_3 + Yb_2O_3$

TABLE 5

| | | Glass No. | | | | | |
|---|---|---|---|---|---|---|---|
| | | 25 | 26 | 27 | 28 | 29 | 30 |
| Composition (mass %) | $B_2O_3$ | 12.60 | 12.48 | 12.41 | 12.31 | 12.17 | 12.70 |
| | SiO2 | 6.44 | 6.17 | 6.73 | 6.38 | 6.31 | 6.58 |
| | $GeO_2$ | 0.00 | 0.00 | 0.00 | 0.00 | 0.00 | 0.00 |
| | $La_2O_3$ | 36.13 | 36.30 | 36.09 | 35.77 | 35.37 | 36.90 |
| | $Gd_2O_3$ | 21.87 | 21.97 | 21.84 | 21.66 | 21.42 | 22.34 |
| | $Y_2O_3$ | 4.08 | 4.10 | 4.08 | 4.04 | 4.00 | 4.17 |
| | $Yb_2O_3$ | 0.00 | 0.00 | 0.00 | 0.00 | 0.00 | 0.00 |
| | $Nb_2O_5$ | 2.98 | 3.00 | 2.98 | 2.95 | 2.92 | 3.05 |
| | $TiO_2$ | 1.93 | 1.94 | 1.92 | 1.91 | 1.89 | 1.97 |
| | $WO_3$ | 0.00 | 0.00 | 0.00 | 1.13 | 2.24 | 0.00 |
| | $ZrO_2$ | 5.71 | 5.74 | 5.70 | 5.66 | 5.59 | 5.84 |
| | $Ta_2O_5$ | 6.31 | 6.34 | 6.30 | 6.25 | 6.18 | 6.45 |
| | ZnO | 1.95 | 1.96 | 1.95 | 1.94 | 1.91 | 0.00 |
| | $Li_2O$ | 0.00 | 0.00 | 0.00 | 0.00 | 0.00 | 0.00 |
| | BaO | 0.00 | 0.00 | 0.00 | 0.00 | 0.00 | 0.00 |
| | $Sb_2O_3$ | 0.00 | 0.00 | 0.00 | 0.00 | 0.00 | 0.00 |
| | Total | 100.00 | 100.00 | 100.00 | 100.00 | 100.00 | 100.00 |
| | RE | 62.08 | 62.37 | 62.01 | 61.47 | 60.79 | 63.41 |
| | $Gd_2O_3$/RE | 0.352 | 0.352 | 0.352 | 0.352 | 0.352 | 0.352 |

TABLE 5-continued

|  |  | Glass No. | | | | | |
| --- | --- | --- | --- | --- | --- | --- | --- |
|  |  | 25 | 26 | 27 | 28 | 29 | 30 |
|  | $Nb_2O_5 + TiO_2 + WO_3 + ZrO_2$ | 10.62 | 10.68 | 10.60 | 11.65 | 12.64 | 10.86 |
|  | $B_2O_3 + SiO_2 + GeO_2$ | 19.04 | 18.65 | 19.14 | 18.69 | 18.48 | 19.28 |
|  | $B_2O_3 + SiO_2$ | 19.04 | 18.65 | 19.14 | 18.69 | 18.48 | 19.28 |
|  | $B_2O_3/(B_2O_3 + SiO_2)$ | 0.66176 | 0.66917 | 0.64838 | 0.65864 | 0.65855 | 0.65871 |
| Properties | nd | 1.87972 | 1.88281 | 1.87868 | 1.88332 | 1.88551 | 1.88013 |
|  | vd | 40.24 | 40.04 | 40.29 | 39.79 | 39.27 | 40.23 |
|  | $2.20170 - 0.0083 \times vd$ | 1.86771 | 1.86937 | 1.86729 | 1.87144 | 1.87576 | 1.86779 |
|  | $2.20580 - 0.0083 \times vd$ | 1.87181 | 1.87347 | 1.87139 | 1.87554 | 1.87986 | 1.87189 |
|  | $2.21000 - 0.0083 \times vd$ | 1.87601 | 1.87767 | 1.87559 | 1.87974 | 1.88406 | 1.87609 |
|  | $2.22700 - 0.0083 \times vd$ | 1.89301 | 1.89467 | 1.89269 | 1.89674 | 1.90106 | 1.89309 |
|  | $2.22500 - 0.0083 \times vd$ | 1.89101 | 1.89267 | 1.89059 | 1.89474 | 1.89906 | 1.89109 |
|  | $2.22400 - 0.0083 \times vd$ | 1.89001 | 1.89167 | 1.88959 | 1.89374 | 1.89806 | 1.89009 |
|  | $2.22300 - 0.0083 \times vd$ | 1.88901 | 1.89067 | 1.88859 | 1.89274 | 1.89706 | 1.88909 |
|  | $2.22200 - 0.0083 \times vd$ | 1.88801 | 1.88967 | 1.88759 | 1.89174 | 1.89606 | 1.88809 |
|  | Liquidus temparature (° C.) | 1250 | 1255 | 1250 | 1250 | 1260 | 1260 |
|  | Glass transition temparature (° C.) | 712.4 | 715.6 | 714 | 713.3 | 712.3 | 731.7 |
|  | λ80 (nm) | 463 | 473 | 480 | 466 | 470 | 596 |
|  | λ70 (nm) | 390 | 394 | 391 | 389 | 390 | 406 |
|  | λ5 (nm) | 339 | 339 | 339 | 341 | 344 | 340 |
|  | Density (g/cm³) | 5.287 | 5.313 | 5.28 | 5.316 | 5.329 | 5.292 |

(Note)
$RE = La_2O_3 + Gd_2O_3 + Y_2O_3 + Yb_2O_3$

TABLE 6

|  |  | Glass No. | | | | | |
| --- | --- | --- | --- | --- | --- | --- | --- |
|  |  | 31 | 32 | 33 | 34 | 35 | 36 |
| Composition | $B_2O_3$ | 11.62 | 12.11 | 12.47 | 12.44 | 12.28 | 13.62 |
| (mass %) | SiO2 | 6.03 | 6.28 | 6.20 | 6.19 | 6.10 | 6.50 |
|  | $GeO_2$ | 0.00 | 0.00 | 0.00 | 0.00 | 0.00 | 0.00 |
|  | $La_2O_3$ | 33.78 | 35.20 | 35.40 | 35.35 | 34.87 | 37.15 |
|  | $Gd_2O_3$ | 20.46 | 21.31 | 21.42 | 21.39 | 21.11 | 22.48 |
|  | $Y_2O_3$ | 3.82 | 3.98 | 4.00 | 3.99 | 3.94 | 4.19 |
|  | $Yb_2O_3$ | 0.00 | 0.00 | 0.00 | 0.00 | 0.00 | 0.00 |
|  | $Nb_2O_5$ | 0.00 | 2.12 | 2.20 | 2.20 | 2.17 | 2.31 |
|  | $TiO_2$ | 0.00 | 1.37 | 1.42 | 1.42 | 1.40 | 2.66 |
|  | $WO_3$ | 10.09 | 2.83 | 2.87 | 2.87 | 2.83 | 3.02 |
|  | $ZrO_2$ | 5.34 | 5.57 | 5.73 | 5.72 | 5.65 | 6.01 |
|  | $Ta_2O_5$ | 5.90 | 6.15 | 6.33 | 6.32 | 6.24 | 0.00 |
|  | ZnO | 2.96 | 3.08 | 1.96 | 1.96 | 1.93 | 2.06 |
|  | $Li_2O$ | 0.00 | 0.00 | 0.00 | 0.15 | 0.00 | 0.00 |
|  | BaO | 0.00 | 0.00 | 0.00 | 0.00 | 1.48 | 0.00 |
|  | $Sb_2O_3$ | 0.00 | 0.00 | 0.00 | 0.00 | 0.00 | 0.00 |
|  | Total | 100.00 | 100.00 | 100.00 | 100.00 | 100.00 | 100.00 |
|  | RE | 58.06 | 60.49 | 60.82 | 60.73 | 59.92 | 63.82 |
|  | $Gd_2O_3/RE$ | 0.352 | 0.352 | 0.352 | 0.352 | 0.352 | 0.352 |
|  | $Nb_2O_5 + TiO_2 + WO_3 + ZrO_2$ | 15.43 | 11.89 | 12.22 | 12.21 | 12.05 | 14.00 |
|  | $B_2O_3 + SiO_2 + GeO_2$ | 17.65 | 18.39 | 18.67 | 18.63 | 18.38 | 20.12 |
|  | $B_2O_3 + SiO_2$ | 17.65 | 18.39 | 18.67 | 18.63 | 18.38 | 20.12 |
|  | $B_2O_3/(B_2O_3 + SiO_2)$ | 0.65836 | 0.65851 | 0.66792 | 0.66774 | 0.66812 | 0.676938 |
| Properties | nd | 1.87732 | 1.88027 | 1.88066 | 1.87928 | 1.87768 | 1.87209 |
|  | vd | 39.84 | 39.96 | 40.03 | 40.08 | 40.1 | 40.1 |
|  | $2.20170 - 0.0083 \times vd$ | 1.87103 | 1.87003 | 1.86945 | 1.86904 | 1.86887 | 1.86887 |
|  | $2.20580 - 0.0083 \times vd$ | 1.87513 | 1.87413 | 1.87355 | 1.87314 | 1.87297 | 1.87297 |
|  | $2.21000 - 0.0083 \times vd$ | 1.87933 | 1.87833 | 1.87775 | 1.87734 | 1.87717 | 1.87717 |
|  | $2.22700 - 0.0083 \times vd$ | 1.89633 | 1.89533 | 1.89475 | 1.89434 | 1.89417 | 1.89417 |
|  | $2.22500 - 0.0083 \times vd$ | 1.89433 | 1.89333 | 1.89275 | 1.89234 | 1.89217 | 1.89217 |
|  | $2.22400 - 0.0083 \times vd$ | 1.89333 | 1.89233 | 1.89175 | 1.89134 | 1.89117 | 1.89117 |
|  | $2.22300 - 0.0083 \times vd$ | 1.89233 | 1.89133 | 1.89075 | 1.89034 | 1.89017 | 1.89017 |
|  | $2.22200 - 0.0083 \times vd$ | 1.89133 | 1.89033 | 1.88975 | 1.88934 | 1.88917 | 1.88917 |
|  | Liquidus temparature (° C.) | 1255 | 1235 | 1230 | 1260 | 1260 | 1260 |
|  | Glass transition temparature (° C.) | 701.9 | 706.9 | 712.3 | 697.4 | 707.9 | 706.8 |
|  | λ80 (nm) | 469 | 482 | 496 | 479 | — | 470 |
|  | λ70 (nm) | 396 | 399 | 398 | 396 | 415 | 399 |
|  | λ5 (nm) | 348 | 343 | 343 | 343 | 343 | 345 |
|  | Density (g/cm³) | 5.503 | 5.359 | 5.354 | 5.388 | 5.346 | 5.171 |

(Note)
$RE = La_2O_3 + Gd_2O_3 + Y_2O_3 + Yb_2O_3$

TABLE 7

| | | Glass No. | | | | | |
|---|---|---|---|---|---|---|---|
| | | 37 | 38 | 39 | 40 | 41 | 42 |
| Composition (mass %) | $B_2O_3$ | 12.42 | 12.45 | 12.36 | 12.43 | 12.27 | 12.47 |
| | SiO2 | 5.94 | 5.95 | 5.91 | 6.18 | 5.86 | 5.96 |
| | $GeO_2$ | 0.00 | 0.00 | 0.00 | 0.00 | 0.00 | 0.00 |
| | $La_2O_3$ | 35.64 | 39.10 | 32.49 | 34.36 | 36.99 | 34.56 |
| | $Gd_2O_3$ | 21.56 | 18.19 | 25.10 | 20.79 | 23.10 | 21.57 |
| | $Y_2O_3$ | 4.02 | 4.07 | 4.04 | 3.88 | 1.83 | 5.18 |
| | $Yb_2O_3$ | 0.00 | 0.00 | 0.00 | 1.92 | 0.00 | 0.00 |
| | $Nb_2O_5$ | 2.19 | 2.20 | 2.18 | 2.19 | 2.17 | 2.20 |
| | $TiO_2$ | 1.41 | 1.42 | 1.41 | 1.41 | 1.40 | 1.42 |
| | $WO_3$ | 2.86 | 2.87 | 2.85 | 2.86 | 2.83 | 2.87 |
| | $ZrO_2$ | 5.71 | 5.47 | 5.43 | 5.71 | 5.39 | 5.48 |
| | $Ta_2O_5$ | 6.30 | 6.32 | 6.28 | 6.31 | 6.23 | 6.33 |
| | ZnO | 1.95 | 1.96 | 1.95 | 1.96 | 1.93 | 1.96 |
| | $Li_2O$ | 0.00 | 0.00 | 0.00 | 0.00 | 0.00 | 0.00 |
| | BaO | 0.00 | 0.00 | 0.00 | 0.00 | 0.00 | 0.00 |
| | $Sb_2O_3$ | 0.00 | 0.00 | 0.00 | 0.00 | 0.00 | 0.00 |
| | Total | 100.00 | 100.00 | 100.00 | 100.00 | 100.00 | 100.00 |
| | RE | 61.22 | 61.36 | 61.63 | 60.95 | 61.92 | 61.31 |
| | $Gd_2O_3$/RE | 0.352 | 0.296 | 0.407 | 0.341 | 0.373 | 0.352 |
| | $Nb_2O_5 + TiO_2 + WO_3 + ZrO_2$ | 12.17 | 11.96 | 11.87 | 12.17 | 11.79 | 11.97 |
| | $B_2O_3 + SiO_2 + GeO_2$ | 18.36 | 18.40 | 18.27 | 18.61 | 18.13 | 18.43 |
| | $B_2O_3 + SiO_2$ | 18.36 | 18.40 | 18.27 | 18.61 | 18.13 | 18.43 |
| | $B_2O_3/(B_2O_3 + SiO_2)$ | 0.67647 | 0.67663 | 0.67652 | 0.66792 | 0.67678 | 0.67661 |
| Properties | nd | 1.88319 | 1.88225 | 1.88181 | 1.8796 | 1.88418 | 1.88123 |
| | vd | 39.95 | 39.99 | 39.97 | 39.69 | 40.01 | 40.15 |
| | $2.20170 - 0.0083 \times vd$ | 1.87012 | 1.86978 | 1.86995 | 1.87227 | 1.86962 | 1.86846 |
| | $2.20580 - 0.0083 \times vd$ | 1.87422 | 1.87388 | 1.87405 | 1.87637 | 1.87372 | 1.87256 |
| | $2.21000 - 0.0083 \times vd$ | 1.87842 | 1.87808 | 1.87825 | 1.88057 | 1.87792 | 1.87676 |
| | $2.22700 - 0.0083 \times vd$ | 1.89542 | 1.89508 | 1.89525 | 1.89757 | 1.89492 | 1.89376 |
| | $2.22500 - 0.0083 \times vd$ | 1.89342 | 1.89308 | 1.89325 | 1.89557 | 1.89292 | 1.89176 |
| | $2.22400 - 0.0083 \times vd$ | 1.89242 | 1.89208 | 1.89225 | 1.89457 | 1.89192 | 1.89076 |
| | $2.22300 - 0.0083 \times vd$ | 1.89142 | 1.89108 | 1.89125 | 1.89357 | 1.89092 | 1.88976 |
| | $2.22200 - 0.0083 \times vd$ | 1.89042 | 1.89008 | 1.89025 | 1.89257 | 1.88992 | 1.88876 |
| | Liquidus temparature (° C.) | 1240 | 1250 | 1260 | 1260 | 1250 | 1245 |
| | Glass transition tamparature (° C.) | 716.9 | 712.1 | 715.3 | 703.2 | 714 | 712.2 |
| | λ80 (nm) | — | 478 | — | 481 | 476 | 534 |
| | λ70 (nm) | 414 | 402 | 425 | 399 | 397 | 405 |
| | λ5 (nm) | 343 | 343 | 344 | 348 | 343 | 344 |
| | Density (g/cm³) | 5.377 | 5.341 | 5.408 | 5.373 | 5.425 | 5.354 |

(Note)
RE = $La_2O_3 + Gd_2O_3 + Y_2O_3 + Yb_2O_3$

TABLE 8

| | | Glass No. | | | | | |
|---|---|---|---|---|---|---|---|
| | | 43 | 44 | 45 | 46 | 47 | 48 |
| Composition (mass %) | $B_2O_3$ | 12.38 | 12.46 | 12.46 | 12.46 | 12.33 | 12.24 |
| | SiO2 | 5.92 | 6.19 | 6.19 | 6.19 | 6.13 | 6.08 |
| | $GeO_2$ | 0.00 | 0.00 | 0.00 | 0.00 | 0.00 | 0.00 |
| | $La_2O_3$ | 35.64 | 36.59 | 37.76 | 38.93 | 31.27 | 30.40 |
| | $Gd_2O_3$ | 22.25 | 18.32 | 15.23 | 12.14 | 27.12 | 29.37 |
| | $Y_2O_3$ | 3.68 | 4.00 | 4.00 | 3.99 | 2.86 | 1.76 |
| | $Yb_2O_3$ | 0.00 | 1.93 | 3.85 | 5.78 | 0.00 | 0.00 |
| | $Nb_2O_5$ | 2.19 | 2.20 | 2.20 | 2.20 | 2.18 | 2.16 |
| | $TiO_2$ | 1.41 | 1.42 | 1.42 | 1.42 | 1.40 | 1.39 |
| | $WO_3$ | 2.85 | 2.87 | 2.87 | 2.87 | 2.84 | 2.82 |
| | $ZrO_2$ | 5.44 | 5.73 | 5.73 | 5.73 | 5.67 | 5.63 |
| | $Ta_2O_5$ | 6.29 | 6.33 | 6.33 | 6.33 | 6.26 | 6.22 |
| | ZnO | 1.95 | 1.96 | 1.96 | 1.96 | 1.94 | 1.93 |
| | $Li_2O$ | 0.00 | 0.00 | 0.00 | 0.00 | 0.00 | 0.00 |
| | BaO | 0.00 | 0.00 | 0.00 | 0.00 | 0.00 | 0.00 |
| | $Sb_2O_3$ | 0.00 | 0.00 | 0.00 | 0.00 | 0.00 | 0.00 |
| | Total | 100.00 | 100.00 | 100.00 | 100.00 | 100.00 | 100.00 |
| | RE | 61.57 | 60.84 | 60.84 | 60.84 | 61.25 | 61.53 |
| | $Gd_2O_3$/RE | 0.361 | 0.301 | 0.250 | 0.200 | 0.443 | 0.477 |

TABLE 8-continued

|  |  | Glass No. | | | | | |
| --- | --- | --- | --- | --- | --- | --- | --- |
|  |  | 43 | 44 | 45 | 46 | 47 | 48 |
|  | $Nb_2O_5 + TiO_2 + WO_3 + ZrO_2$ | 11.89 | 12.22 | 12.22 | 12.22 | 12.09 | 12.00 |
|  | $B_2O_3 + SiO_2 + GeO_2$ | 18.30 | 18.65 | 18.65 | 18.65 | 18.46 | 18.32 |
|  | $B_2O_3 + SiO_2$ | 18.30 | 18.65 | 18.65 | 18.65 | 18.46 | 18.32 |
|  | $B_2O_3/(B_2O_3 + SiO_2)$ | 0.6765 | 0.6681 | 0.6681 | 0.6681 | 0.66793 | 0.66812 |
| Properties | nd | 1.88269 | 1.87947 | 1.87894 | 1.87877 | 1.88052 | 1.88126 |
|  | vd | 39.94 | 40.01 | 40.10 | 40.13 | 40.10 | 40.09 |
|  | $2.20170 - 0.0083 \times vd$ | 1.8702 | 1.86962 | 1.86887 | 1.86862 | 1.86887 | 1.86895 |
|  | $2.20580 - 0.0083 \times vd$ | 1.8743 | 1.87372 | 1.87297 | 1.87272 | 1.87297 | 1.87305 |
|  | $2.21000 - 0.0083 \times vd$ | 1.8785 | 1.87792 | 1.87717 | 1.87692 | 1.87717 | 1.87725 |
|  | $2.22700 - 0.0083 \times vd$ | 1.8955 | 1.89492 | 1.89417 | 1.89392 | 1.89417 | 1.89425 |
|  | $2.22500 - 0.0083 \times vd$ | 1.8935 | 1.89292 | 1.89217 | 1.89192 | 1.89217 | 1.89225 |
|  | $2.22400 - 0.0083 \times vd$ | 1.8925 | 1.89192 | 1.89117 | 1.89092 | 1.89117 | 1.89125 |
|  | $2.22300 - 0.0083 \times vd$ | 1.8915 | 1.89092 | 1.89017 | 1.88992 | 1.89017 | 1.89025 |
|  | $2.22200 - 0.0083 \times vd$ | 1.8905 | 1.88992 | 1.88917 | 1.88892 | 1.88917 | 1.88925 |
|  | Liquidus temparature (° C.) | 1245 | 1240 | 1250 | 1250 | 1260 | 1260 |
|  | Glass transition temparature (° C.) | 718 | 714 | 714 | 713 | 714 | 716.5 |
|  | λ80 (nm) | 486 | — | — | 343 | — | — |
|  | λ70 (nm) | 400 | 452 | 459 | 403 | 469 | — |
|  | λ5 (nm) | 343 | 344 | 344 | 492 | 345 | 345 |
|  | Density (g/cm³) | 5.391 | 5.34 | 5.338 | 5.34 | 5.423 | 5.462 |

(Note)
$RE = La_2O_3 + Gd_2O_3 + Y_2O_3 + Yb_2O_3$

TABLE 9

|  |  | Glass No. | | | | | |
| --- | --- | --- | --- | --- | --- | --- | --- |
|  |  | 49 | 50 | 51 | 52 | 53 | 54 |
| Composition | $B_2O_3$ | 12.15 | 12.05 | 11.71 | 11.38 | 12.24 | 11.93 |
| (mass %) | SiO2 | 6.04 | 6.45 | 6.74 | 7.04 | 6.55 | 6.39 |
|  | $GeO_2$ | 0.00 | 0.00 | 0.00 | 0.00 | 0.00 | 0.00 |
|  | $La_2O_3$ | 29.56 | 34.76 | 34.78 | 34.79 | 35.32 | 34.41 |
|  | $Gd_2O_3$ | 31.58 | 21.03 | 21.04 | 21.05 | 21.37 | 20.82 |
|  | $Y_2O_3$ | 0.67 | 3.97 | 3.97 | 3.97 | 4.03 | 3.93 |
|  | $Yb_2O_3$ | 0.00 | 0.00 | 0.00 | 0.00 | 0.00 | 0.00 |
|  | $Nb_2O_5$ | 2.15 | 1.41 | 1.41 | 1.41 | 1.43 | 0.13 |
|  | $TiO_2$ | 1.38 | 1.41 | 1.41 | 1.41 | 1.43 | 1.40 |
|  | $WO_3$ | 2.80 | 2.85 | 2.86 | 2.86 | 2.90 | 5.05 |
|  | $ZrO_2$ | 5.59 | 5.69 | 5.69 | 5.70 | 5.78 | 5.64 |
|  | $Ta_2O_5$ | 6.17 | 8.43 | 8.44 | 8.44 | 8.57 | 8.35 |
|  | ZnO | 1.91 | 1.95 | 1.95 | 1.95 | 0.38 | 1.93 |
|  | $Li_2O$ | 0.00 | 0.00 | 0.00 | 0.00 | 0.00 | 0.00 |
|  | BaO | 0.00 | 0.00 | 0.00 | 0.00 | 0.00 | 0.00 |
|  | $Sb_2O_3$ | 0.00 | 0.00 | 0.00 | 0.00 | 0.00 | 0.02 |
|  | Total | 100.00 | 100.00 | 100.00 | 100.00 | 100.00 | 100.00 |
|  | RE | 61.81 | 59.76 | 59.79 | 59.81 | 60.72 | 59.16 |
|  | $Gd_2O_3/RE$ | 0.511 | 0.352 | 0.352 | 0.352 | 0.352 | 0.352 |
|  | $Nb_2O_5 + TiO_2 + WO_3 + ZrO_2$ | 11.92 | 11.36 | 11.37 | 11.38 | 11.54 | 12.22 |
|  | $B_2O_3 + SiO_2 + GeO_2$ | 18.19 | 18.50 | 18.45 | 18.42 | 18.79 | 18.32 |
|  | $B_2O_3 + SiO_2$ | 18.19 | 18.50 | 18.45 | 18.42 | 18.79 | 18.32 |
|  | $B_2O_3/(B_2O_3 + SiO_2)$ | 0.66795 | 0.65135 | 0.63469 | 0.61781 | 0.65141 | 0.6512 |
| Properties | nd | 1.88214 | 1.88064 | 1.88084 | 1.88116 | 1.87994 | 1.87929 |
|  | vd | 39.95 | 40.23 | 40.11 | 40.18 | 40.12 | 39.93 |
|  | $2.20170 - 0.0083 \times vd$ | 1.87012 | 1.86779 | 1.86879 | 1.86821 | 1.8687 | 1.87028 |
|  | $2.20580 - 0.0083 \times vd$ | 1.87422 | 1.87189 | 1.87289 | 1.87231 | 1.8728 | 1.87438 |
|  | $2.21000 - 0.0083 \times vd$ | 1.87842 | 1.87609 | 1.87709 | 1.87651 | 1.877 | 1.87858 |
|  | $2.22700 - 0.0083 \times vd$ | 1.89542 | 1.89309 | 1.89409 | 1.89351 | 1.894 | 1.89558 |
|  | $2.22500 - 0.0083 \times vd$ | 1.89342 | 1.89109 | 1.89209 | 1.89151 | 1.892 | 1.89358 |
|  | $2.22400 - 0.0083 \times vd$ | 1.89242 | 1.89009 | 1.89109 | 1.89051 | 1.891 | 1.89258 |
|  | $2.22300 - 0.0083 \times vd$ | 1.89142 | 1.88909 | 1.89009 | 1.88951 | 1.89 | 1.89158 |
|  | $2.22200 - 0.0083 \times vd$ | 1.89042 | 1.88809 | 1.88909 | 1.88851 | 1.889 | 1.89058 |
|  | Liquidus temparature (° C.) | 1265 | 1230 | 1245 | 1255 | 1240 | 1230 |
|  | Glass transition temparature (° C.) | 717.7 | 713 | 720 | 720.4 | 723 | 715 |
|  | λ80 (nm) | — | — | — | 482 | 463 | 576 |
|  | λ70 (nm) | 430 | 445 | — | 396 | 395 | 399 |
|  | λ5 (nm) | 345 | 344 | 346 | 344 | 345 | 347 |
|  | Density (g/cm³) | 5.507 | 5.387 | 5.391 | 5.4 | 5.374 | 5.42 |

(Note)
$RE = La_2O_3 + Gd_2O_3 + Y_2O_3 + Yb_2O_3$

TABLE 10

| | | Glass No. | | | | |
|---|---|---|---|---|---|---|
| | | 55 | 56 | 57 | 58 | 59 |
| Composition (mass %) | $B_2O_3$ | 12.11 | 11.99 | 12.43 | 12.28 | 12.04 |
| | SiO2 | 6.48 | 6.41 | 6.66 | 6.58 | 6.45 |
| | $GeO_2$ | 0.00 | 0.00 | 0.00 | 0.00 | 0.00 |
| | $La_2O_3$ | 34.92 | 34.57 | 35.11 | 34.97 | 34.75 |
| | $Gd_2O_3$ | 21.13 | 20.92 | 21.24 | 21.16 | 21.03 |
| | $Y_2O_3$ | 3.99 | 3.95 | 4.01 | 4.00 | 3.97 |
| | $Yb_2O_3$ | 0.00 | 0.00 | 0.00 | 0.00 | 0.00 |
| | $Nb_2O_5$ | 0.13 | 2.68 | 1.46 | 1.44 | 1.41 |
| | $TiO_2$ | 2.19 | 0.63 | 2.47 | 2.07 | 1.41 |
| | $WO_3$ | 2.87 | 2.84 | 0.00 | 1.08 | 2.85 |
| | $ZrO_2$ | 5.72 | 5.66 | 5.88 | 5.81 | 5.69 |
| | $Ta_2O_5$ | 8.48 | 8.39 | 8.71 | 8.60 | 8.43 |
| | ZnO | 1.96 | 1.94 | 2.01 | 1.99 | 1.95 |
| | $Li_2O$ | 0.00 | 0.00 | 0.00 | 0.00 | 0.00 |
| | BaO | 0.00 | 0.00 | 0.00 | 0.00 | 0.00 |
| | $Sb_2O_3$ | 0.02 | 0.02 | 0.02 | 0.02 | 0.02 |
| | Total | 100.00 | 100.00 | 100.00 | 100.00 | 100.00 |
| | RE | 60.04 | 59.44 | 60.36 | 60.13 | 59.75 |
| | $Gd_2O_3$/RE | 0.352 | 0.352 | 0.352 | 0.352 | 0.352 |
| | $Nb_2O_5 + TiO_2 + WO_3 + ZrO_2$ | 10.91 | 11.81 | 9.81 | 10.40 | 11.36 |
| | $B_2O_3 + SiO_2 + GeO_2$ | 18.59 | 18.40 | 19.09 | 18.86 | 18.49 |
| | $B_2O_3 + SiO_2$ | 18.59 | 18.40 | 19.09 | 18.86 | 18.49 |
| | $B_2O_3/(B_2O_3 + SiO_2)$ | 0.65143 | 0.65163 | 0.65113 | 0.65111 | 0.65116 |
| Properties | nd | 1.8802 | 1.8801 | 1.87979 | 1.88009 | 1.88072 |
| | vd | 39.90 | 40.26 | 40.25 | 40.10 | 40.12 |
| | $2.20170 - 0.0083 \times vd$ | 1.87053 | 1.86754 | 1.86763 | 1.86887 | 1.8687 |
| | $2.20580 - 0.0083 \times vd$ | 1.87463 | 1.87164 | 1.87173 | 1.87297 | 1.8728 |
| | $2.21000 - 0.0083 \times vd$ | 1.87883 | 1.87584 | 1.87593 | 1.87717 | 1.877 |
| | $2.22700 - 0.0083 \times vd$ | 1.89583 | 1.89284 | 1.89293 | 1.89417 | 1.894 |
| | $2.22500 - 0.0083 \times vd$ | 1.89383 | 1.89084 | 1.89093 | 1.89217 | 1.892 |
| | $2.22400 - 0.0083 \times vd$ | 1.89283 | 1.88984 | 1.88993 | 1.89117 | 1.891 |
| | $2.22300 - 0.0083 \times vd$ | 1.89183 | 1.88884 | 1.88893 | 1.89017 | 1.89 |
| | $2.22200 - 0.0083 \times vd$ | 1.89083 | 1.88784 | 1.88793 | 1.88917 | 1.889 |
| | Liquidus temperature (° C.) | 1230 | 1280 | 1230 | 1230 | 1230 |
| | Glass transition temparature (° C.) | 715 | 712 | 715 | 715 | 714 |
| | λ80 (nm) | 469 | 463 | 459 | 460 | 480 |
| | λ70 (nm) | 398 | 393 | 394 | 394 | 397 |
| | λ5 (nm) | 346 | 343 | 342 | 343 | 344 |
| | Density (g/cm³) | 5.374 | 5.393 | 5.303 | 5.338 | 5.388 |

(Note)
RE = $La_2O_3 + Gd_2O_3 + Y_2O_3 + Yb_2O_3$

Example 2

Press-molding glass materials were produced from the optical glasses Nos. 1 to 59 of Example 1 as follows.

Glass raw materials were prepared so as to obtain the above glasses, charged into a crucible made of platinum, heated, melted, clarified and stirred to obtain homogeneous molten glasses. Then, each molten glass was caused to flow out from a flow-out pipe at a constant flow rate, and cast into a mold that was horizontally placed below the flow-out pipe to mold them into glass plates having a constant thickness each. Each of the molded glass plates was continuously withdrawn in the horizontal direction from an opening portion provided in a side surface of the mold, carried into an annealing furnace by means of a belt conveyor and gradually cooled.

The gradually cooled glass plates were cut or split to prepare glass pieces, and these glass pieces were barrel-polished to obtain press-molding glass materials.

Example 3

A release agent that was a boron nitride powder was uniformly applied to the entire surface of each of the press-molding glass materials obtained in Example 2, and the above gobs were heated to soften them and press-molded to give blanks of various lenses such as concave meniscus lenses, convex meniscus lenses, biconvex lenses, biconcave lenses, plano-convex lenses, plano-concave lenses, etc., and prisms.

These blanks were annealed to reduce a strain inside each glass and to finely adjust their optical properties such as refractive indices, etc., such that they were desired values.

Then, the blanks were ground and polished to make various lenses such as concave meniscus lenses, convex meniscus lenses, biconvex lenses, biconcave lenses, plano-convex lenses, plano-concave lenses, etc., and prisms. The thus-obtained optical elements may be surface-coated with an anti-reflection film each.

INDUSTRIAL UTILITY

This invention is an optical glass that is supplied at a low coast but that has excellent thermal stability, can be stably supplied and has high-refractivity low-dispersion properties and that is suitable as a material for press-molding glass materials and optical elements.

The invention claimed is:
1. An optical glass comprising, by mass %,
   1 to 30% of $B_2O_3$,
   5.86 to 20% of $SiO_2$,
   55 to 75% of a total of $La_2O_3$, $Gd_2O_3$, $Y_2O_3$ and $Yb_2O_3$,
   the content of $La_2O_3$ being 15 to 55%, the mass ratio of the content of $Gd_2O_3$ to the total content of $La_2O_3$, $Gd_2O_3$,

Y$_2$O$_3$ and Yb$_2$O$_3$, (Gd$_2$O$_3$/La$_2$O$_3$+Gd$_2$O$_3$+Y$_2$O$_3$+Yb$_2$O$_3$), being 0.25 to 0.65,
0 to 13% of Ta$_2$O$_5$ (exclusive of 13%),
0 to 25% of a total of Nb$_2$O$_5$, TiO$_2$, WO$_3$ and ZrO$_2$, the content of Nb$_2$O$_5$ being less than 10%, and
0 to 5% WO$_3$ and
having a glass transition temperature of 650° C. or higher, a refractive index nd of 1.875 to 1.92 and an Abbe's number vd of 36 to 45.

2. The optical glass of claim 1, which has an refractive index nd and an Abbe's number vd that satisfy the following expression (1), $$nd \geq 2.2017 - 0.0083 \times vd \quad (1).$$

3. The optical glass of claim 1, which has a liquidus temperature of 1,300° C. or lower.

4. The optical glass of claim 1, which contains 13.75 to 40% of Gd$_2$O$_3$, 0 to 25% of Y$_2$O$_3$ and 0 to 5% of Yb$_2$O$_3$.

5. A press-molding glass material formed of the optical glass recited in claim 1.

6. An optical element formed of the optical glass recited in claim 1.

7. A process for producing an optical element, which comprises heating the press-molding glass material recited in claim 5 to soften it, then press-molding the softened glass material to produce an optical element blank and grinding and polishing said blank.

8. An optical glass comprising, by mass %,
1 to 30% of B$_2$O$_3$,
5.86 to 20% of SiO$_2$,
55 to 75% of a total of La$_2$O$_3$, Gd$_2$O$_3$, Y$_2$O$_3$ and Yb$_2$O$_3$, the content of La$_2$O$_3$ being 15 to 55%, the mass ratio of the content of Gd$_2$O$_3$ to the total content of La$_2$O$_3$, Gd$_2$O$_3$, Y$_2$O$_3$ and Yb$_2$O$_3$, (Gd$_2$O$_3$/La$_2$O$_3$+Gd$_2$O$_3$+Y$_2$O$_3$+Yb$_2$O$_3$), being 0.25 to 0.65,
0 to 13% of Ta$_2$O$_5$ (exclusive of 13%), and
greater than 7.5% mp to 25% of a total of Nb$_2$O$_5$, TiO$_2$, WO$_3$ and ZrO$_2$, the content of Nb$_2$O$_5$ being less than 10%, wherein the optical glass is devoid of Li$_2$O, and
0 to 5% WO$_3$ and
the glass has transition temperature of 650° C. or higher, a refractive index nd of 1.875 to 1.92 and an Abbe's number vd of 36 to 45.

* * * * *